United States Patent [19]

Buxbaum et al.

[11] 4,373,044

[45] Feb. 8, 1983

[54] FLAME-PROOFED PLASTICS MOULDING COMPOUNDS

[75] Inventors: Lothar Buxbaum, Lindenfels; Franz Breitenfellner, Bensheim, both of Fed. Rep. of Germany

[73] Assignee: Ciba-Geigy Corporation, Ardsley, N.Y.

[21] Appl. No.: 208,365

[22] Filed: Nov. 19, 1980

[30] Foreign Application Priority Data

Nov. 28, 1979 [CH] Switzerland .................... 10579/79

[51] Int. Cl.$^3$ ..................... C08K 3/22; C08K 3/34; C08K 5/52; C08K 5/53
[52] U.S. Cl. .................... 524/132; 524/133; 524/143; 524/147; 524/413; 524/430; 524/445; 524/447; 524/465; 524/469
[58] Field of Search ......... 260/40 R, 45.7 R, 45.75 F; 528/289, 299; 524/430, 445, 447, 143, 132, 413

[56] References Cited

U.S. PATENT DOCUMENTS

| | | | |
|---|---|---|---|
| 2,455,873 | 12/1948 | Nordlander et al. | 260/22 R |
| 2,931,746 | 4/1960 | Robitschek et al. | 528/299 |
| 3,039,993 | 6/1962 | Friedman | 260/45.7 PH |
| 3,285,995 | 11/1966 | Nametz et al. | 528/299 |
| 3,367,905 | 2/1968 | Zimberg et al. | 528/299 |
| 3,640,949 | 2/1972 | Dalzell | 260/45.75 R |
| 3,751,396 | 8/1973 | Gall | 260/40 R |
| 3,997,510 | 12/1976 | Habermeier | 528/289 |
| 4,032,509 | 6/1977 | Lee | 260/45.7 R |
| 4,045,513 | 8/1977 | Knopka | 260/45.7 R |
| 4,111,905 | 9/1978 | Larkin et al. | 260/45.7 R |
| 4,273,899 | 6/1981 | Saiki et al. | 260/45.7 R |
| 4,280,949 | 7/1981 | Dieck | 524/445 |

FOREIGN PATENT DOCUMENTS

2751969 6/1978 Fed. Rep. of Germany.

OTHER PUBLICATIONS

Handbook of Fillers and Reinforcements for Plastics, Katz et al., 1978, pp. 174 and 176.

*Primary Examiner*—John Kight, III
*Assistant Examiner*—R. A. White
*Attorney, Agent, or Firm*—Luther A. R. Hall

[57] ABSTRACT

The invention relates to plastics moulding compounds which have been flame-proofed with organic chlorine- or bromine-containing compounds, said moulding compounds containing at least one aerosol selected from the group comprising the highly dispersed silicates, highly dispersed alumina, and highly dispersed titanium dioxide, and, optionally, a dibasic or tribasic oxyacid of phosphorus or an ester thereof. These moulding compounds have a reduced corrosive action on contact metals.

6 Claims, No Drawings

FLAME-PROOFED PLASTICS MOULDING COMPOUNDS

The present invention relates to a flame-proofed plastics moulding compound which has a reduced corrosive action on metals and metal alloys, to a composition for effecting such action and to the use thereof.

Duroplasts and thermoplastics have attained great importance as moulding compounds for the production of technical mouldings. For many applications, e.g. mouldings for the electrical industry, it is necessary to reduce combustibility. To accomplish this, halogen-containing organic compounds are usually incorporated in the moulding compound, optionally together with compounds of elements of the 5th main group of the Periodic Table which have a synergistic action. Of the halogen-containing compounds, the organic chlorine- and bromine-containing compounds are used in particular.

Mouldings are often so formed that the moulding compound comes into direct or indirect contact with metal parts, e.g. through sealing or encasing metal parts. As a consequence thereof, the corrosive action of the moulding compound on metals can be of considerable importance. Flame-proofed moulding compounds often promote corrosion, even on surrounding metal parts, whereby the range of application is restricted or also premature malfunctioning of such mouldings or metal parts can occur. Examples of such metal parts are electrical contacts made of brass, silvered brass, nickel silver, or tin bronze (contact metals).

It is the object of the present invention to provide flame-proofed plastics moulding compounds which have a reduced corrosive action on contact metals.

Accordingly, the present invention provides a plastics moulding compound which has been flame-proofed with organic chlorine- or bromine-containing compounds, in which moulding compound there is incorporated 0.1 to 10% by weight, based on said moulding compound, of one or more aerosols selected from the group comprising the highly dispersed silicates, highly dispersed alumina, and highly dispersed titanium dioxide.

It has been found that the corrosive action can be further reduced by additionally incorporating in the moulding compound at least 0.1% by weight of a dibasic or tribasic oxyacid of phosphorus (component b).

The aerosol (component a) and the component (b) are each preferably incorporated in the moulding compound in an amount of 0.1 to 5% by weight, in particular 0.5 to 3% by weight. The weight ratio of component (a) to component (b) is preferably 90 to 10% by weight of (a) to 10 to 90% by weight of (b), in particular 70 to 30% by weight of (a) to 30 to 70% by weight of (b).

Suitable oxyacids of phosphorus are principally phosphorous acid, phosphoric acid or phosphonic acid. The esters of the phosphorus acids also comprise partial esters. The ester radical is derived from aliphatic, cycloaliphatic and aromatic alcohols which preferably contain from 1 to 10 carbon atoms. The esters can also be derived from polyols such as diols, triols or tetrols, in which case they then have cyclic or polymeric structures.

A preferred group of the phosphorus acids or their esters is that of the formula

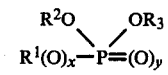

wherein each of x and y is 0 or 1 and the sum of $x+y$ is 1 or 2, and each of $R^1$, $R^2$ and $R^3$ independently is a hydrogen atom or a hydrocarbon radical of aliphatic or aromatic character containing preferably 1 to 20 carbon atoms.

The hydrocarbon radical R can contain 1 to 20, preferably 1 to 10, carbon atoms, and can be alkyl, cycloalkyl, aryl, alkaryl, aralkyl and alkaralkyl.

Alkyl, which preferably contains 1 to 10, especially 1 to 6, carbon atoms, is e.g.: methyl, ethyl, propyl, isopropyl, n-butyl, tert-butyl, pentyl, hexyl, heptyl, octyl, 2-ethylhexyl, nonyl, decyl, dodecyl, tetradecyl, octadecyl and eicosyl.

Aryl and alkaryl, which contain preferably 6 to 12 and 7 to 12 carbon atoms respectively, are e.g.: phenyl, naphthyl, methylphenyl, dimethylphenyl, ethylphenyl, propylphenyl, butylphenyl, hexylphenyl, tert-butylphenyl, methyl-(tert-butyl)phenyl, nonylphenyl.

Aralkyl and alkaralkyl, which preferably contain 7 to 12 and 8 to 12 carbon atoms respectively, are e.g.: benzyl, β-phenylethyl, phenylpropyl, methylbenzyl, dimethylbenzyl, dibutylbenzyl, methylbutylbenzyl, (methylphenyl)ethyl, (dimethylphenyl)ethyl, (dibutylphenyl)ethyl.

Most preferably, $R^1$ to $R^3$ are phenyl, benzyl, cyclohexyl or alkyl of 1 to 4 carbon atoms. If x is 1 and y is 0 or 1, $R^1$ to $R^3$ are preferably hydrocarbon radicals. If x 0 and y is 1, $R^2$ and $R^3$ are also preferably hydrogen atoms and $R^1$ is a hydrocarbon radical. Particularly valuable additives are triphenylphosphate and benzenephosphonic acid.

Silicate aerosols are known and commercially available products. They are finely dispersed substances having an average particle diameter of about 1 to 200μ, and most preferably 5 to 50μ, and which normally have a high internal surface area. This can be at least 50 or 100 or more than 200 m²/g. These products are also termed highly dispersed silicates.

Examples of silicate aerosols are those derived from alkali metal and alkaline earth metal silicates, such as sodium or calcium silicate, and others such as aluminium silicate and other metal silicates. Silicates containing more than one metal cation, such as sodium and calcium silicates or sodium and aluminium silicates, can also be used, as well as silicates in the crystal lattice of which silicon is partly replaced by aluminium. A preferred group of silicates comprises the natural and synthetic zeoliths.

Highly dispersed metal oxides, such as aluminium oxide and titanium dioxide, can also be obtained by the aerosil process and are likewise commercial products.

Flame retardants based on organic chlorine-containing and/or bromine-containing compounds are also known. They can be compounds which are incorporated in the plastics material as mixture component, or compounds which, as reactive monomers, are built into the polymer molecule. Examples of these latter compounds are chlorostyrene, tribromostyrene, tetrachlorophthalic anhydride, dichlorotetraphthalic acid or the lower alkyl esters thereof, tetrabromophthalic anhydride, tetrabromo-bisphenol A, N,N'-bis(β-hydroxyethyl)tetrachloro- or -tetrabromobenzimidazolone.

Further examples of chlorine-containing and/or bromine-containing compounds are: polytribromostyrene, polypentabromostyrene, decabromodiphenyl, tetrabromodiphenyl, hexabromodiphenyl ether, octabromodiphenyl ether, decabromodiphenyl ether, tetrabromodiphenyl sulfide, hexabromodiphenylsulfone, 3-(2',4',6'-tribromophenoxy)-1,2-propanediol, di- or tetrabromophthalic acid and anhydrides thereof, dibromoterephthalic acid, hydroxyethylated dibromo- or tetrabromobisphenol A, tetrabromo-1,4-(dihydroxymethyl)benzene, tetrabromobenzimidazolone, N,N'-alkylene-bis-tetrabromophthalimide as well as the chlorine-containing analogues. Further halogen-containing compounds are described e.g. in German Offenlegungsschrift 2 242 450.

The organic chlorine- and bromine-containing compounds are often used together with synergistic compounds of the 5th main group of the Periodic Table of the Elements. To be singled out for special mention are the phosphorus and antimony compounds, e.g phosphates or, in particular, antimony trioxide.

Suitable plastics materials are both duroplasts and thermoplastics, with thermoplastics being preferred.
Examples are:

1. Polymers, which are derived from hydrocarbons having single or double unsaturation, such as polyolefins, e.g. polyethylene which can be uncrosslinked or crosslinked, polypropylene, polyisobutylene, polymethylbut-1-ene, polymethylpent-1-ene, polybut-1-ene, polyisoprene, polybutadiene, polystyrene, polyisobutylene, copolymers of the monomers based on the above homopolymers, such as ethylene-propylene copolymers, propylene-but-1-ene copolymers, propylene-isobutylene copolymers, and terpolymers of ethylene and propylene with a diene, for example hexadiene, dicyclopentadiene or ethylidene-norbornene; mixtures of the above homopolymers, for example mixtures of polypropylene and polyethylene, polypropylene and polybut-1-ene, propylene and polyisobutylene.
2. Halogen-containing vinyl polymers, such as polyvinyl chloride, polyvinylidene chloride, polyvinyl fluoride, as well as polychloropropene and chlorinated rubbers.
3. Polymers which are derived from α,β-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylate copolymers.
4. Polymers which are derived from unsaturated alcohols and amines and their acyl derivatives or acetals, such as polyvinyl alcohol, polyvinyl acetate, polyvinyl stearate, polyvinyl benzoate and polyvinyl maleate, polyvinylbutyral, polyallyl phthalate, polyallyl melamine and their copolymers with other vinyl compounds, such as ethylene/vinyl acetate copolymers.
5. Homo- and copolymers which are derived from epoxides, such as polyethylene oxide or the polymers which are derived from bisglycidyl ethers.
6. Polyacetals, such as polyoxymethylene and polyoxyethylene, and those which contain ethylene oxide as comonomer.
7. Polyphenylene oxides.
8. Polycarbonates.
9. Polysulfones.
10. Polyamides and copolyamides which are derived from diamines and dicarboxylic acids and/or from aminocarboxylic acids or the corresponding lactams, such as polyamide 6, polyamide 6/6, polyamide 6/10, polyamide 11, polyamide 12. These constitute a preferred group of plastics.
11. Crosslinked polymers which are derived from aldehydes on the one hand and from phenols, ureas and melamines on the other, such as phenol-formaldehyde, urea-formaldehyde and melamine-formaldehyde resins.
12. Alkyd resins, such as glycerol-phthalic acid resins and their mixtures with melamine-formaldehyde resins.
13. Unsaturated polyester resins, which are derived from copolyesters of unsaturated and unsaturated dicarboxylic acids with polyhydric alcohols, as well as vinyl compounds as crosslinking agents.
14. Natural polymers, such as cellulose, rubber, and their chemically modified homologous compounds, such as cellulose acetate, propionate and butyrates, or the cellulose ethers, such as methyl cellulose.
15. An especially preferred group of polymers consists of the thermoplastic polyesters based on aliphatic, cycloaliphatic and/or aromatic dicarboxylic acids and aliphatic, cycloaliphatic and/or aromatic diols.

A particularly important group of polyesters comprises those which contain at least 25 mol.%, preferably at least 40 mol.%, of terephthalic acid radicals, and at least 25 mol.%, preferably at least 40 mol.%, of alkylenediol radicals, based on the polyester. The linear or branched alkylenediol radicals can contain 2 to 12, preferably 2 to 6, carbon atoms, and are, in particular, ethylene glycol or 1,4-butylene glycol radicals. Further monomers known for the manufacture of polyesters, as well as polyesters, are described e.g. in German Offenlegungsschrift 2 751 969. Bromine-containing monomers which can be introduced into the polyester molecules by condensation have been described previously. These compounds can be brominated dicarboxylic acids or diols.

The incorporation of the additives can be effected, for example, by blending in the individual components together or singly and, optionally, further additives, by methods commonly employed in the art, before or during forming, or also by applying the dissolved or dispersed compounds to the polymer and, if desired, subsequently evaporating the solvent. The additives, e.g. up to 3% by weight, can also be added before or during the polymerisation. Larger amounts are advantageously incorporated by regranulating existing granules from the melt state in an extruder.

Examples of further additives and inert substances together with which the flame retardant composition can be employed, are antioxidants, UV stabilisers or other light stabilisers, plasticisers, lubricants, mould release agents, crystallisation promoters, fluorescent whitening agents, dulling agents, dyes and pigments, inert or reinforcing fillers such as carbon black, talcum, kaolin, metal powder, wollastonite, glass beads or powdered glass, quartz powder, asbestos fibres and glass fibres, dispersants.

The moulding compounds of this invention are valuable engineering plastics for the production of flame-resistant mouldings of all kinds. They have a reduced corrosive action on contact metals. It is thus possible to extend the range of application of corrosive flame-resistant moulding compounds and to compensate for fluctuations in quality with those moulding compounds having reduced corrosive action.

The following Examples illustrate the invention in more detail.

EXAMPLES 1 TO 5 AND COMPARISON EXAMPLES A TO C

A 10 liter reactor, equipped with stirrer, nitrogen inlet, separating column and thermometer, is charged with 3380 g of dimethyl terephthalate (DMT), 3600 g of butanediol-1,4, 753 g of 1,3-bis(hydroxyethyl)-4,5,6,7-tetrabromobenzimidazolone (7 mol.%, based on DMT) and 2.3 g of tetraisopropyltitanate, and the mixture is heated to 140° C. With stirring and while introducing nitrogen, 95% of the theoretical amount of methanol is distilled off, whereupon the temperature of the reaction mixture rises to 215° C. The transesterification product is charged into a second reactor and 447 g of $Sb_2O_3$ (8% by weight), 55.9 g of the phosphorus compound (1% by weight) and 55.9 g of an aerosol (1% by weight), suspended in butanediol-1,4, are added. The reaction mixture is heated to 230° C., and then a vacuum of 40 torr is applied with a water jet pump in the course of half an hour. While raising the reaction temperature to 250° C., the vacuum is raised to 0.50 torr with a vacuum pump in the course of 45 minutes. Reaction temperature and vacuum are then kept for 2 hours under these reaction conditions, and then the reactor is discharged. This resultant polyester, with a relative viscosity of 1.90, is granulated.

Further bromine-containing polyesters containing the additives indicated in the following table are synthesised in analogous manner. The properties of these polyesters and the subsequent test results are likewise reported in the table.

Standard test bars are prepared by injection moulding. 20 bars together with 4 small metal plates (silver brass, nickel silver, brass and tin bronze) are suspended in a 1 liter vessel with locking means. (The distance between the bars and the metal plates is 6 cm). The whole arrangement is kept for 5 days at 200° C. The plates are then examined for corrosion, their appearance being rated from 1 (=best possible rating) to 9 (=worst rating).

chlorine- or bromine-containing compounds, which comprises (a) a thermoplastic polyester, and
(b) from 0.1 to 10%, by weight based on said moulding compound, of one or more aerosols selected from the group consisting of the highly dispersed silicates, highly dispersed alumina, and highly dispersed titanium dioxide incorporated in (a), and wherein the aerosol has an internal surface area of at least 50 m²/g.

2. A moulding compound according to claim 1, in which there is incorporated 0.5 to 3%, by weight, of aerosol.

3. A moulding compound according to claim 1, wherein component (a) is a polyester which is the random copolyester derived from the diols, 1,4-butanediol (46.5 mol%) and 1,3-bis(2-hydroxyethyl)-4,5,6,7-tetrabromobenzimidazolone (3.5 mol %), and the diacid, terephthalic acid (50 mol%), all mol% values being based on the total copolyester.

4. A moulding compound according to claim 1 which additionally contains (c) from 0.1 to 5% by weight of an oxyacid of phosphorus or ester thereof of the formula

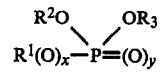

wherein each of x and y is 0 or 1 and the sum of x+y is 1 or 2, and each of $R^1$, $R^2$ and $R^3$ independently is hydrogen, alkyl of 1 to 10 carbon atoms, cycloalkyl of 5 to 7 carbon atoms, aryl of 6 to 12 carbon atoms, aralkyl of 7 to 12 carbon atoms or alkaralkyl of 8 to 12 carbon atoms.

5. A moulding compound according to claim 4, in which there is incorporated a highly dispersed aluminium silicate in combination with triphenyl phosphate or benzenephosphonic acid.

6. A method of reducing the corrosive action on metals and metal alloys of a thermoplastic polyester moulding compound which has been flame-proofed with one or more organic chlorine- or bromine-containing compounds, which method comprises incorporating in said moulding compound at least one aerosol selected

TABLE

| Example | Aerosol (1% by weight) | Phosphoric acid/ phosphate (1% by weight) | rel. viscosity (polyester) | Corrosive action | | | |
|---|---|---|---|---|---|---|---|
| | | | | silvered brass | brass | nickel silver | tin bronze |
| A | — | — | 1.91 | 3 | 3 | 6 | 8 |
| B | — | benzenephosphonic acid | 1.89 | 3 | 3 | 8 | 8 |
| C | — | triphenylphosphate | 1.97 | 2 | 3 | 3 | 9 |
| 1 | Al-silicate[1] | — | 2.03 | 2 | 3 | 3 | 5 |
| 2 | $Al_2O_3$[2] | — | 1.92 | 2 | 3 | 3 | 4 |
| 3 | $TiO_2$[3] | — | 1.95 | 2 | 3 | 4 | 5 |
| 4 | Al-silicate[1] | triphenylphosphate | 1.92 | 1 | 2 | 3 | 4 |
| 5 | $Al_2O_3$[2] | benzenephosphonic acid | 2.15 | 1 | 2 | 3 | 3 |

[1]commercial product P820 available from Degussa
[2]commercial product $Al_2O_3$—C available from Degussa
[3]commercial product $TiO_2P25$ available from Degussa

What is claimed is:

1. A thermoplastic polyester moulding compound, which has been flameproofed with one or more organic from the group consisting of the highly dispersed silicates, highly dispersed alumina, and highly dispersed titanium dioxide alone or in combination with a dibasic or tribasic oxyacid of phosphorus or ester thereof, wherein the aerosol has an internal surface area of at least 50 m²/g.

* * * * *